July 10, 1951          J. L. FERGUSON          2,559,862

APPARATUS FOR TREATING WINDROWS

Filed Oct. 28, 1944          2 Sheets-Sheet 1

Inventor
John L. Ferguson
By Thiess, Olson & Mecklenburger
Attys.

July 10, 1951           J. L. FERGUSON           2,559,862
APPARATUS FOR TREATING WINDROWS
Filed Oct. 28, 1944           2 Sheets-Sheet 2
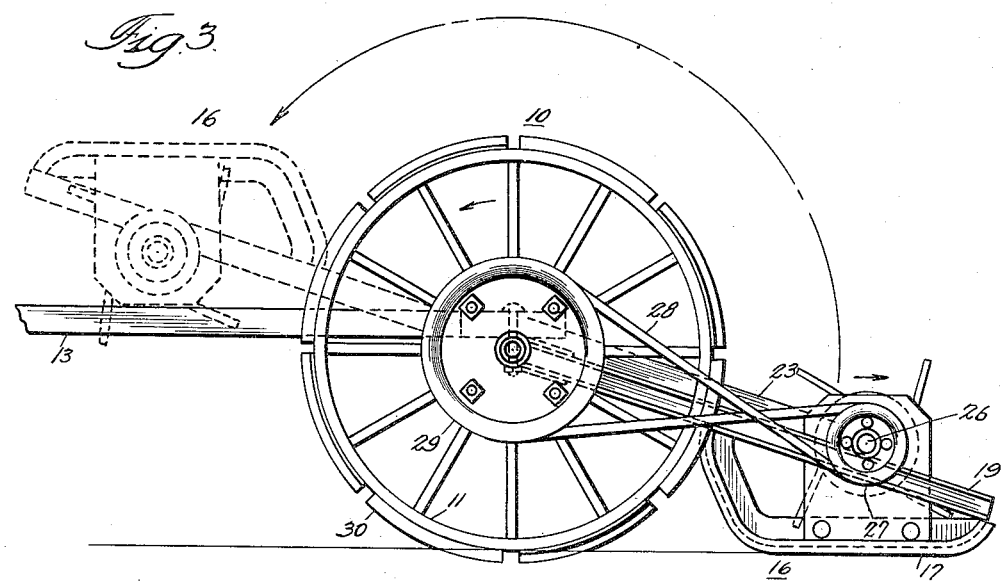
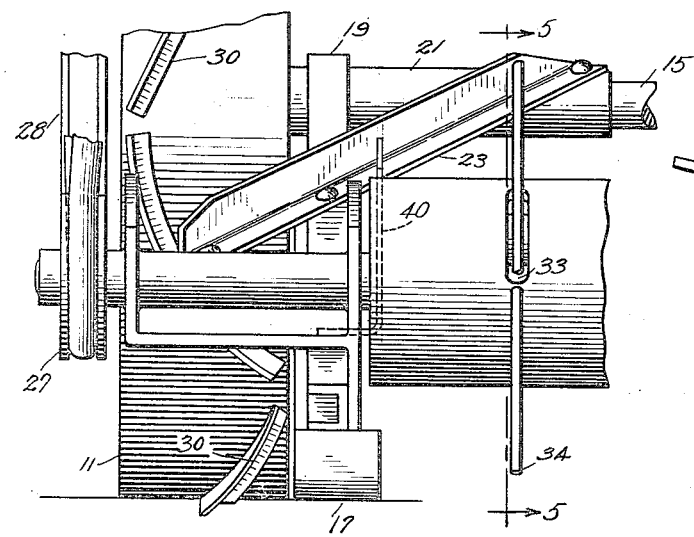
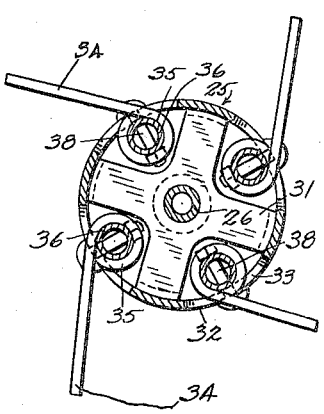
Inventor:
John L. Ferguson
By Thiess, Olsen & Mecklenburger
Attys.

Patented July 10, 1951

2,559,862

UNITED STATES PATENT OFFICE 2,559,862

APPARATUS FOR TREATING WINDROWS

John L. Ferguson, Burlington, Iowa, assignor to J. I. Case Company, Racine, Wis., a corporation of Wisconsin Application October 28, 1944, Serial No. 560,810

3 Claims. (Cl. 56—372)

My invention relates to apparatus for treating windrows of crops or the like, more particularly to apparatus for lifting and agitating such windrows, and it is an object of the invention to provide improved apparatus of this character.

In the use of modern farming machinery for handling crops after cutting them, for example, threshing with a combine, it is well known to first place a cut crop into a windrow in order that the combine may move along the windrow in a generally straight line. Windrowing comprises cutting the crop and gathering it into a windrow where it cures into proper condition for threshing or further treatment. After the crop has lain in the windrow for some time, the weight of the crop itself and other natural conditions, such as rain, may cause the crop to settle and become packed, thus preventing proper curing and necessitating that the crop in the windrow be lifted from the ground, agitated to allow circulation of air through the crop, and redeposited on the ground. Well known devices for treating windrows lift the crop from the ground and scatter it widely and therefore it is another object of the invention to provide an improved method of treating a windrow which comprises lifting, agitating and redepositing the windrow on the ground without breaking the continuity thereof.

In carrying out the invention in one form, a wheeled carriage adapted to be driven along the windrow is provided with a rotating drum which passes underneath the windrow, the drum rotating in a direction opposite to the direction of rotation of the wheels and the drum being provided with tines extending from the periphery of the drum and having a peripheral speed substantially equal to the linear speed of the carriage.

For a more complete understanding of the invention, reference should be had to the accompanying drawings, in which Figure 1 shows a tractor pulling a machine treating a windrow according to the invention;

Fig. 3 is an elevational view of the machine illustrated in Fig. 2;

Fig. 4 is an enlarged view of a portion of Fig. 2 showing constructional details; and Fig. 5 is a detailed sectional view taken substantially along the line 5—5 of Fig. 4.

Figure 1:
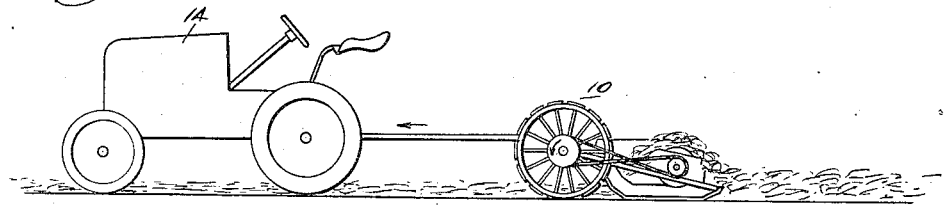
Figure 2:
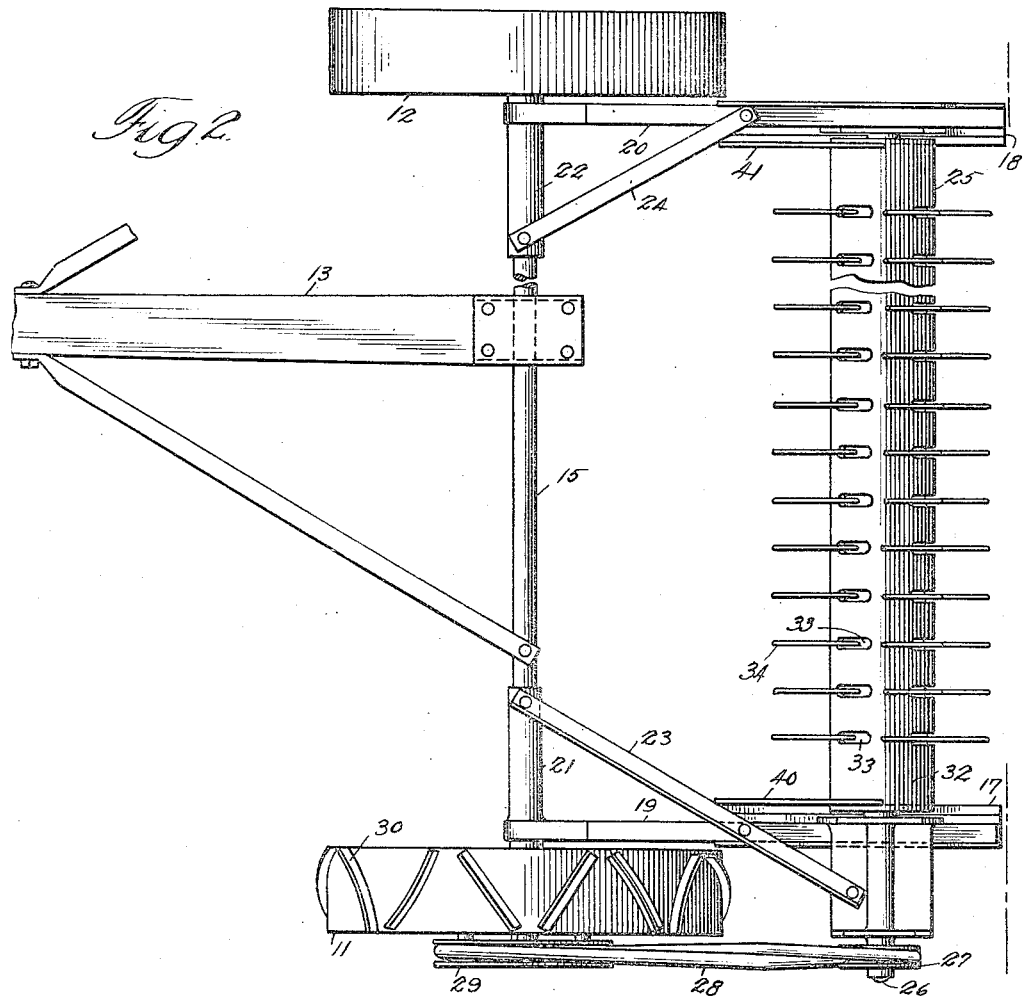
Fig. 2 is a plan view of a machine embodying the invention.

Referring to the drawings, the invention is shown as embodied in a carriage 10 having two wheels 11 and 12 with a drawbar or tongue 13 which may be attached by any well known means to a tractor 14 or the like, the wheels 11 and 12 being mounted on an axle 15. A floating carriage 16 (Fig. 3) comprising a pair of runners 17 and 18 for supporting the floating carriage on the ground and adapted to straddle the windrow is fastened to the axle 15 by two frame members 19 and 20, connected respectively to two hollow sleeves 21 and 22 loosely surrounding and swiveled on the axle 15. Extending between the frame members 19 and 20 which are braced to sleeves 21 and 22 by braces 23 and 24 is a pickup drum 25 arranged to revolve on an axle 26. The drum 25 is arranged to rotate in a direction opposite to the direction of rotation of wheels 11 and 12 by means of a pulley 27 driven by a crossed belt 28 from the pulley 29 attached to the wheel 11, suitable cleats 30 being provided to prevent the wheel 11 from slipping as the carriage 10 is drawn along the ground.

The drum 25 comprises a framework 31 (Fig. 5) surrounded by a circular shell 32 of metal, suitable slots 33 being cut into the shell through which extend the spring tines 34. The spring tines 34 are flexible and made in pairs connected by two oppositely wound loop-connected helical coils 35 surrounding a pipe 36 which is secured to the shell 32, the pipe 36 being provided with holes for receiving the bolts 38 which clamp the loops of the spring tines 34 against the pipe 36, thereby securing the tines in position, as shown in the Krause Patent No. 2,324,261.

In order to pick up the crop, the length of the spring tines is such that the tips will lightly engage the ground as the carriage passes over the windrow, and in order to prevent the continuity of the windrow from being broken, the radial length of the spring tines 34 is such that the peripheral speed of the end of the spring tines is substantially equal to the linear speed of the carriage moving along the ground. Consequently the tips of the spring tines 34 when in the uppermost position will be substantially stationary with respect to the ground and when in the lowermost position will be moving forward at substantially twice the speed of the carriage above. A pair of shields 40 and 41 may be provided on the runners 17 and 18 for preventing the windrow from slipping off of the ends of the drum 25.

For moving the machine to and from the field, the pickup drum 25 may be lifted and swung upwardly and forwardly so that the drum will rest on the drawbar or tongue 13 (Fig. 3), the runners 17 and 18 and the frame members 19 and 20 swinging about the axle 15 of the carriage on sleeve members 21 and 22 as the pickup drum is moved from operative to inoperative position, and vice versa. The drive belt 28 may be removed to prevent rotation of the pickup drum when it is not being used.

In use the tractor 14 draws the carriage 10 behind it with the wheels 11 and 12 straddling the windrow and the tips of the spring tines 34 lightly touching the ground, the peripheral speed of the tines being substantially equal to the linear speed of the carriage and rotating in reverse direction. The windrow will be picked up, moved over the drum and deposited on the rear side of the carriage, resulting in a fluffing and loosening of the crop without breaking its continuity.

While I have shown a particular embodiment of my invention, it will be understood, of course, that I do not wish to be limited thereto since many modifications may be made and I therefore contemplate by the appended claims to cover any such modifications as fall within the true spirit and scope of my invention.

Having thus described my invention, what I claim and desire to obtain by Letters Patent is:

1. A machine for treating a windrow of a crop or the like comprising in combination, a wheeled carriage adapted to be drawn along said windrow, a rotatable drum mounted on said carriage for extending underneath said windrow transversely thereof, means for rotating said drum opposite to the direction of rotation of the carriage wheels, said drum being provided with tines rotating with said drum and extending from its periphery to lift the mass of the windrow and redeposit it in windrow formation on the stubble, said drum having a speed such that in their uppermost position the tops of the tines have a resultant speed substantially of zero with respect to the ground whereby the windrow is treated while preserving the continuity thereof, said machine having a floating trailing frame having its front end rockably secured to said carriage and having said drum rotatably mounted adjacent its rear end.

2. A machine for treating a windrow of a crop or the like comprising in combination, a wheeled carriage adapted to be drawn along said windrow, a rotatable drum mounted on said carriage for extending underneath said windrow transversely thereof, mean for rotating said drum opposite to the direction of rotation of the carriage wheels, said drum being provided with tines rotating with said drum and extending from its periphery to lift the mass of the windrow and redeposit it in windrow formation on the stubble, said drum having a speed such that in their uppermost position the tops of the tines have a resultant speed substantially of zero with respect to the ground whereby the windrow is treated while preserving the continuity thereof, said machine having a floating trailing frame having its front end rockably secured to said carriage and having said drum rotatably mounted adjacent its rear end and having ground-engaging supporting means for supporting the axis of said drum the required height above the ground.

3. In a windrow agitator the combination of a carriage having spaced ground-engaging wheels and a drawbar, a frame pivotally connected with said carriage in trailing relation, ground-engaging supporting means on the frame, a pick-up drum journaled on the frame in position to engage and pass underneath a windrow, over which said carriage passes, and redeposit it in windrow formation on the stubble while maintaining its continuity, and transmission means for rotating said pick-up drum from one of said ground-engaging wheels in a direction opposite to said wheels and at such a peripheral speed that the top of the drum has a resultant speed substantially of zero with respect to the ground.

JOHN L. FERGUSON.

REFERENCES CITED

The following references are of record in the file of this patent:

UNITED STATES PATENTS

| Number | Name | Date |
|---|---|---|
| 99,833 | Bryson | Feb. 15, 1870 |
| 598,623 | Bond | Feb. 8, 1898 |
| 1,016,655 | Tisch | Feb. 6, 1912 |
| 1,847,399 | Innes | Mar. 1, 1932 |
| 2,330,910 | Ostman | Oct. 5, 1943 |

FOREIGN PATENTS

| Number | Country | Date |
|---|---|---|
| 198,914 | Switzerland | Feb. 1, 1939 |